US008610305B2

(12) United States Patent
Sarid et al.

(10) Patent No.: US 8,610,305 B2
(45) Date of Patent: Dec. 17, 2013

(54) RETROFITTING POWER DISTRIBUTION DEVICE AND USES THEREOF

(75) Inventors: Shay Sarid, Moshav Givat Chen (IL); Irmi Inbar, Hod Hasharon (IL)

(73) Assignee: Hinbit Development Ltd., Hod Hasharon, IL (US)

( * ) Notice: Subject to any disclaimer, the term of this patent is extended or adjusted under 35 U.S.C. 154(b) by 26 days.

(21) Appl. No.: 12/310,904

(22) PCT Filed: Sep. 18, 2006

(86) PCT No.: PCT/IL2006/001091
§ 371 (c)(1),
(2), (4) Date: Mar. 12, 2009

(87) PCT Pub. No.: WO2008/035322
PCT Pub. Date: Mar. 27, 2008

(65) Prior Publication Data
US 2009/0323257 A1  Dec. 31, 2009

(51) Int. Cl.
*H02J 3/14* (2006.01)
*H01H 83/00* (2006.01)
*H01B 1/24* (2006.01)
*H01H 89/00* (2006.01)

(52) U.S. Cl.
USPC .............................. 307/31; 709/230; 307/116

(58) Field of Classification Search
USPC ........................................................ 307/31
See application file for complete search history.

(56) References Cited

U.S. PATENT DOCUMENTS

| 3,751,676 | A | * | 8/1973 | Igarashi et al. | 307/31 |
| 4,719,446 | A | * | 1/1988 | Hart | 340/12.32 |
| 5,689,261 | A | * | 11/1997 | Mehta et al. | 341/173 |
| 5,905,442 | A | * | 5/1999 | Mosebrook et al. | 340/3.7 |
| 5,942,814 | A | | 8/1999 | Sutterlin | |
| 6,220,897 | B1 | * | 4/2001 | Maxwell | 439/652 |
| 6,365,989 | B1 | * | 4/2002 | O'Donnell | 307/42 |
| 6,514,652 | B2 | | 2/2003 | Cash, Jr. | |
| 6,799,091 | B2 | * | 9/2004 | Bradford | 700/295 |
| 6,967,565 | B2 | | 11/2005 | Lingemann | |
| 2002/0047774 | A1 | * | 4/2002 | Christensen et al. | 340/3.54 |
| 2006/0235958 | A1 | * | 10/2006 | Motoyama | 709/223 |
| 2007/0143456 | A1 | * | 6/2007 | Mashinsky | 709/223 |

OTHER PUBLICATIONS

International Search Report dated Sep. 25, 2007 for Application PCT/IL2006/001091.

* cited by examiner

*Primary Examiner* — Rexford Barnie
*Assistant Examiner* — Toan Vu
(74) *Attorney, Agent, or Firm* — Eitan, Mehulal & Sadot

(57) ABSTRACT

A power distribution device (100) is provided which is adapted for use at a junction point (103) between an electrical panel (121) and an electric outlet and/or switch (101) of a home. The device may include a switching circuit (104) adapted to regulate power flow between one or more junction point input lines and one or more junction point output lines, and a communication module (105) functionally associated with the switching circuit and adapted to receive power regulation instructions from a central, usually, remote; controller (106). There is also provided a power distribution controller adapted to communicate and provide power regulation instructions to one or more power distribution devices. A method is also provided for imparting smart-home capabilities to a non-smart home.

13 Claims, 6 Drawing Sheets

RETROFITTING POWER DISTRIBUTION DEVICE AND USES THEREOF

CROSS-REFERENCE TO RELATED APPLICATIONS

The present application is a United States National Phase of PCT International Application Number PCT/IL2006/001091, filed on Sep. 18, 2006, which is incorporated herein by reference in its entirety.

FIELD OF THE DISCLOSURE

The present disclosure relates to the field of smart homes. More specifically, the present disclosure relates to a retrofit power distribution device and to a power distribution system using a retrofit power distribution device.

BACKGROUND

Today, there exist several methodologies for operating and controlling electrical devices (for example lamps, switches, sockets, fans, and so on) within a specified environment such as homes, all of which may be under an umbrella called "Smart Home" or "Intelligent Home". In general, intelligent home is a concept whereby embedded computers, sensors and actuators are used to automate or control functions within the built environment.

Home automation is a field within building automation, specializing in the specific automation requirements of private homes and in the application of automation techniques for the comfort and security of its residents. Although many techniques used in building automation (such as light and climate control, control of doors and window shutters, security and surveillance systems, and so on) are also used in home automation, additional functions in home automation include the control of multi-media home entertainment systems, automatic plant watering and so on. When home automation is installed during construction of a new home, usually control wires are added before the wall or drywall is installed or before its construction is completed. These control wires usually run to a central controller, which may then control the environment.

Typically, a central controller in a smart home communicates activation instructions, and sometimes other kinds of data, to different electrical devices controlled by it. Depending on the used control methodology, such communications may take place over the power lines, by using any powerline protocol specified herein or other powerline protocols, or wirelessly, by using any wireless protocol specified herein or other wireless protocols. Exemplary protocols are X10, UPB, INSTEON, Z-Wave, Bluetooth, HomePlug, INSTEON, Wi-Fi and ZigBee. Of course, a device that is intended to be incorporated into a smart home has to be able to receive, interpret and use data communicated to it from the central controller. Dynalite, for example, is a company that designs and manufactures technology solutions for lighting control and building automation applications. Cytech Technology is another company that manufactures Home Automation solutions.

Traditionally, a home can be made a smart home either by being originally planned and constructed as such, or, after its construction as non smart-home, by substituting non-smart-home devices with smart-home devices. Smart home technology is far more expensive in comparison to non smart-home technology (hereinafter referred to as a "basic home technology", also a "basic electrical system"). For example, equipping a 3-room apartment with a smart home technology may cost between US$ 4,000 and US$ 24,000, depending on the involved home technology, number and type of used smart devices, actual configuration, and so on.

Substituting a basic home technology with a smart home technology usually has several drawbacks. Firstly, there is a need to adapt the house to accommodate smart home devices (smart switches, smart lamps, and so on), the wired and/or wireless communication devices required for operating them, and the wires interconnecting them. That is, non-smart electrical devices have to be replaced with smart home devices, and the electrical wiring (at least part of it) has to be redone. Replacing electrical devices and redoing the wiring system are costly. Secondly, if communications between the controller and a smart home device are broken, the smart home devices will become uncontrollable. For example, if a smart electrical lamp cannot receive "ON"/"OFF" instructions, the lamp will uncontrollably stay "ON" or "OFF" (depending on its status at the time of the communication malfunction). In such a case the lamp (or any other smart device for that matter) circuit will not function properly until the malfunction is removed.

Therefore, there has been a long felt need in the home technology field for imparting smart-home like capabilities to basic electrical systems, in a way that is convenient and by far cheaper in comparison with traditional smart home technologies.

GLOSSARY

"Power regulation instruction" means herein an instruction or command that may change electrical connectivity in one or more electrical circuits, creates and/or disconnects one or more electrical paths or loops, and/or relays, shifts or diverts electrical power from one or more electric input lines to other one or more electric output wires.

"X10" is an industry standard power line protocol for communication among devices. It primarily uses power line wiring for signalling and control, where the signals involve brief radio frequency bursts representing digital information.

"UPB" (Universal Powerline Bus) is an industry emerging standard for communication among devices. UPB uses power line wiring for signal and control. UPB was developed by PCS Powerline Systems of Northridge, Calif. and released in 1999. Based on the concept of the X10 standard, UPB has an improved transmission rate and higher reliability.

"Bluetooth" is an industrial specification for wireless personal area networks (PANs), also known as IEEE 802.15.1. Bluetooth provides a way to connect and exchange information between devices like personal digital assistants (PDAs), mobile phones, laptops, Personal Computers (PCs), and so on, using a secure, globally unlicensed short range radio frequency (RF).

"HomePlug" is a standard body for power line communication. This organization of about 50 companies sets the global HomePlug standard, currently at v 1.0. HomePlug 1.0 is the specification for a technology that connects devices to each other through the power lines in a home.

"INSTEON" is a hybrid (wireless and powerline) home-control networking technology invented by SmartLabs Technology, a subsidiary of SmartLabs Inc. INSTEON was developed for home control and automation applications, such as basic lighting control systems to more advanced home automation features. The INSTEON network protocol is a dual mesh (RF and powerline) home management network technology, that is backwards compatible with X10 and provides a secure home management network for home innovations.

"Wi-Fi" (also WiFi, Wi-fi or wifi) is a brand originally licensed by the Wi-Fi Alliance to describe the underlying technology of wireless local area networks (WLAN) based on the IEEE 802.11 specifications. Wi-Fi was intended to be used for mobile computing devices, such as laptops, and in LANs, but is now often used for increasingly more applications, including Internet and Voice over Internet Protocol (VoIP) phone access and basic connectivity of electronic electronics such as televisions and DVD (Digital Versatile Disc, or Digital Video Disc) players.

"ZigBee" is the name of a specification for a suite of high level communication protocols using small, low-power digital radios based on the IEEE 802.15.4 standard for wireless personal area networks (WPANs).

"Z-Wave" is the interoperable wireless communication standard developed by Danish company Zensys and the Z-Wave Alliance. Z-Wave is designed for low-power and low-bandwidth appliances, such as home automation and sensor networks. Currently, Z-Wave is the most widely adopted wireless home control standard.

"Electrical connector" is a device for joining electrical circuits together. Most electrical connectors provide an electrical connection that can be relatively easily established and separated, but connectors are also available to facilitate permanent connections. There are many types of electrical connectors, such as terminal blocks, "crimp-on" terminals, Plug and socket connectors, and so on. Terminal blocks, for example, provide a convenient means of connecting individual electrical wires.

"Power socket" (also known as electrical socket, power point, mains socket, plug-in, electric outlet, receptacle, or female power connector) is a connection point that delivers mains electricity when a plug is inserted into it. It is the opposite of a plug, and usually has only female features.

"Light-emitting diodes" (LED) are semiconductor devices that emit incoherent narrow-spectrum light when electrically biased in the forward direction. This effect is a form of electroluminescence. LEDs can be used as low-efficiency photodiodes in signal applications. A LED may be paired with a photodiode or phototransistor in the same package, to form an opto-isolator, which is a device that uses a short optical transmission path to transfer a signal between elements of a circuit, typically a transmitter and a receiver, while keeping them electrically isolated. That is, since the signal is transformed from an electrical signal to an optical signal and back to an electrical signal, electrical contact along the path is broken.

"Triac" is an electronic component approximately equivalent to two silicon controlled rectifiers (SCRs/thyristors) joined in inverse parallel (paralleled but with the polarity reversed) and with their gates connected together. This results in a bidirectional electronic switch which can conduct current in either direction when it is triggered (turned on). It can be triggered by either a positive or a negative voltage being applied to its gate electrode. Once triggered, the device continues to conduct until the current through it drops below a certain threshold value, such as at the end of a half-cycle of alternating current (AC) main power. This makes the Triac a very convenient switch for AC circuits, allowing the control of very large power flows with milliampere-scale control currents. In addition, applying a trigger pulse at a controllable point in an AC cycle allows one to control the percentage of current that flows through the Triac to the load (so-called phase control).

"Interactive voice response" (IVR) is a computerized system that allows a person, typically a telephone caller, to select an option from a voice menu. Generally the system plays pre-recorded voice prompts to which the person presses a number on a telephone keypad to select a chosen option, or speaks simple answers such as "yes", "no", or numbers in answer to the voice prompts.

"PSTN" (Public Switched Telephone Network) is the concentration of the world's public circuit-switched telephone networks.

"WiMax" is defined as Worldwide Interoperability for Microwave Access by the WiMAX Forum, formed in April 2001 to promote conformance and interoperability of the IEEE 802.16 standard, officially known as WirelessMAN. The Forum describes WiMAX as "a standards-based technology that enables the delivery of last mile wireless broadband access as an alternative to cable and DSL.

"IrDA" (Infrared Data Association) is, in general, an industry infrared protocol. IrDA defines physical specifications communications protocol standards for the short range exchange of data over infrared light, for uses such as personal area networks (PANs). IrDA interfaces are commonly used, for example in palmtop (a Handheld PC, or H/PC for short, which is a computer smaller than any standard notebook PC or laptop) computers and mobile phones. IrDA is also used to control VCR (VideoCassette Recorder), Audio Systems, DVD and Air condition devices.

X10, UPB, Bluetooth, HomePlug, INSTEON, Wi-Fi, ZigBee, Z-Wave, Electrical connector, Power socket, LED, Triac and IVR, PSTN, IrDA and WiMax are more fully described, for example in Wikipedia (the free encyclopedia), the content of which is herein incorporated by reference.

SUMMARY

The following embodiments and aspects thereof are described and illustrated in conjunction with systems, tools and methods, which are meant to be exemplary and illustrative, not limiting in scope. In various embodiments, one or more of the above-described problems have been reduced or eliminated, while other embodiments are directed to other advantages or improvements.

As part of the present disclosure a retrofit power distribution device ("PDD") is provided for imparting smart-home like capabilities to a basic (non-smart) electrical system. The power distribution device may be adapted for use at a junction point between an electrical panel (for example a home's main electrical panel) and a non-smart electric outlet and/or non-smart electric devices (such as switches, lamps, fans, and so on). According to an embodiment of the present disclosure the power distribution device may include a switching circuit that may be adapted to regulate power flow between a junction point input line and one or more junction point output lines and a communication module functionally associated with the switching circuit and adapted to receive power regulation instructions, for example from a controller. According to an embodiment of the present disclosure the power distribution device may further include a controller that may be adapted to communicate with, and to receive power regulation, or power distribution, instructions from, a central controller, through the communication module.

As part of the present disclosure a central controller (also referred to herein as "central power distribution controller") may be provided, which is adapted to communicate with one or more power distribution devices through their communication module. According to an embodiment of the present disclosure a power distribution device may communicate control, power regulation instructions and other kinds of data to another power distribution device directly, or indirectly, through the central controller or other one or more PDDs. Communications between the central controller and a power distribution device and/or between two power distribution devices may be based on any communication technology and wire and/or wireless communication protocol existing today (for example ZigBee, Z-Wave, and so on), or on communication protocols that will be devised in the future. Then communication module may be adapted to communicate with the central controller using optical signals (for example Infrared signals) or radio frequency (RF) signals.

According to an embodiment of the present disclosure the controller may be further adapted to sense the status (for example "Open" or "Close") of an associated non-smart switch, by activating and/or deactivating corresponding one or more controllable switches in the switching circuit. The controller may be further adapted to translate sensed status of switch(es) to power regulation instructions for initiating, triggering or otherwise causing the activation of, or the provision of electrical power to, non-smart electrical devices in a predetermined manner.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. It is intended that the embodiments and figures disclosed herein be considered illustrative, rather than restrictive. The disclosure, however, both as to organization and method of operation, together with objects, features, and advantages thereof, may best be understood by reference to the following detailed description when read with the accompanying figures, in which:

FIG. 2b schematically illustrates an exemplary junction point for implementing the exemplary electric circuit diagram of FIG. 2a;

FIG. 3b schematically illustrates an exemplary junction point for implementing the exemplary electric circuit diagram of FIG. 3a;

It will be appreciated that for simplicity and clarity of illustration, elements shown in the figures have hot necessarily been drawn to scale. For example, the dimensions of some of the elements may be exaggerated relative to other elements for clarity. Also, at times singular or plural (or options between singular and plural) may be described, however, notations or descriptions of singular include, or is to be construed as, plural, and plural include, or is to be construed as singular where possible or appropriate.

DETAILED DESCRIPTION

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic quantities within the computing system's registers and/or memories into other data similarly represented as physical quantities within the computing system's memories, registers or other such information storage, transmission or display devices.

The switching and control elements, devices and systems presented herein are not related to any particular switching elements, devices and controllers. Various general purpose switching elements, devices and/or controllers may be used with programs in accordance with the teachings herein, or it may prove convenient to construct a more specialized apparatus to perform the desired method. The desired structure for a variety of these systems will appear from the description below. In addition, embodiments of the present disclosure are not described with reference to any particular programming language and/or communication protocol. It will be appreciated that a variety of programming languages and communication protocols, whether alone or in combination with other programming languages and/or communication protocols, whether they exist today or will be devised in the future, may be used to implement the teachings of the disclosure as described herein.

Figure 1:
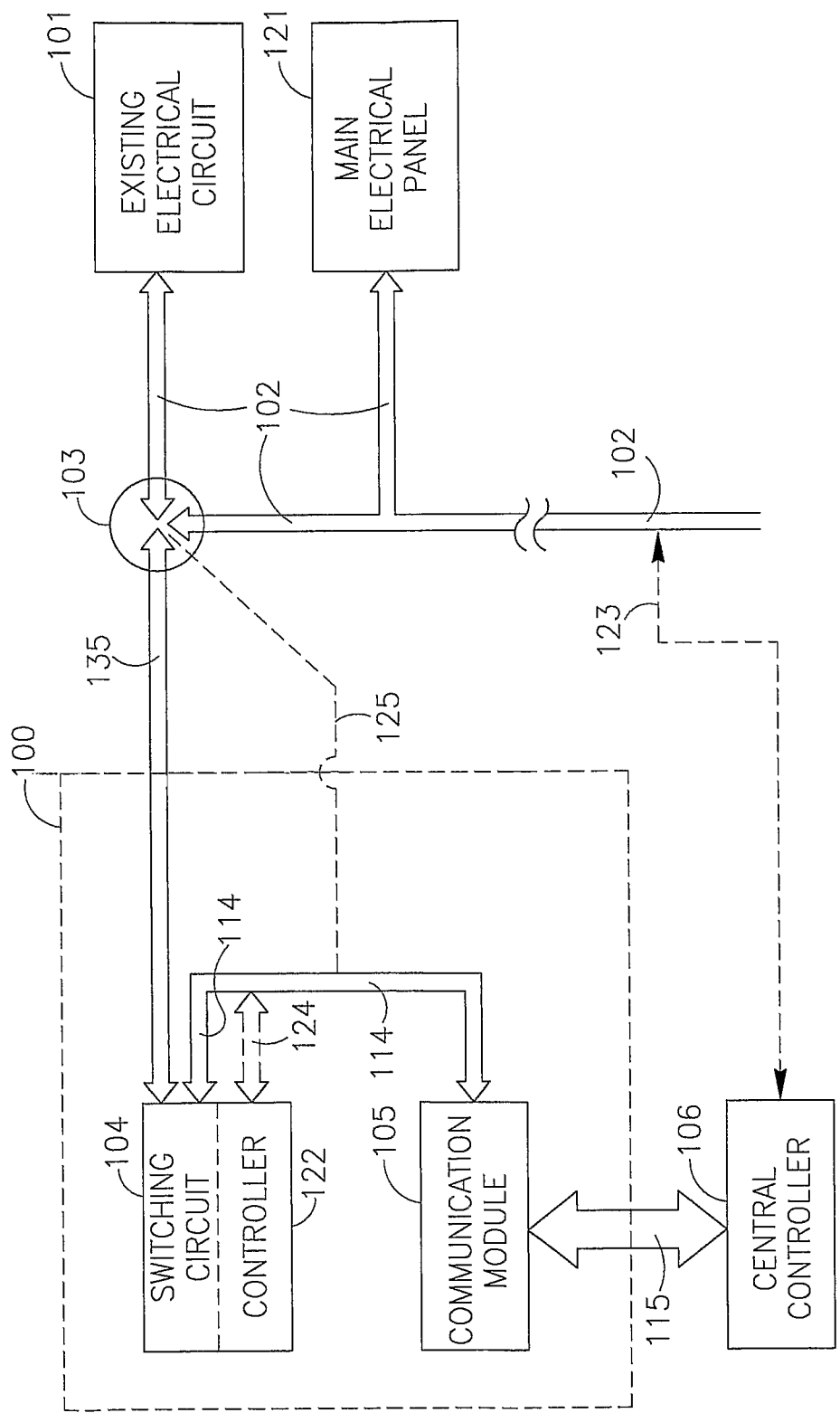
FIG. 1 schematically illustrates a general layout and functionality of a power distribution device according to an embodiment of the present disclosure.

FIG. 1 schematically illustrates a general layout and functionality of a power distribution device ("PDD", generally shown at 100) according to an embodiment of the present disclosure. Reference numeral 101 designates an existing electric circuit ("EEC") that may be a sub-circuit of a larger basic home's electrical system which may include a junction point such as junction point ("JP") 103 between main electrical panel 121 and EEC 101. EEC 101 may include non-smart ("dumb") switches, dumb lamps, dumb power socket or several grouped power sockets, dumb fan(s), and so on, and associated wiring.

JP 103 may be part of the power line system feeding the basic home's electrical, system. Through JP 103, which is usually a box made of an insulating material such as plastic, electric wires (generally shown at 102), which constitute part a an electric wiring system associated with a basic home technology, may be used to receive from, and/or to forward to, EEC 101 power regulation instructions (hereinafter referred to also as "instructions", for brevity) to activate or inactivate, enable or disable, electrical components or devices belonging to EEC 101. For example, an instruction to switch a lamp may be forwarded from EEC 101 to JP 103, and the power required to activate the lamp may be forwarded in the opposite way; that is, from JP 103 to EEC 101, as is more fully described, for example in connection with FIG. 2a.

According to an embodiment of the present disclosure PDD 100 may include a switching circuit (generally shown at 104) that may be adapted to regulate power flow between JP 103 input lines and one or more JP 103 output lines. JP 103 input and output lines may be part of wiring system 102. PDD 100 may also include a communication module (shown at 105) functionally coupled to (shown at 114), or otherwise associated with, Switching Circuit 104 and adapted to receive power regulation instructions, for example from central controller 106, through communication path 115. According to an embodiment of the present disclosure PDD 100 may further include a controller (shown at 122) that may be adapted to communicate (shown at 124, 114 and 115) with, and to receive power regulation instructions from, a central controller such as Central Controller 106 (through Communication Module 105).

As part of the present disclosure central controller 106 may be adapted to communicate with one or more power distribution devices (PDDs) through their communication module. For example, Central controller 106 is schematically shown communicating with PDD 100 through communication module 105. According to an embodiment of the present disclosure a power distribution device, such as PDD 100, may communicate control and other kinds of data to another power distribution device directly, or indirectly; that is, through central controller 106, using substantially any communication technology and power line protocols and/or wireless communication protocol existing today (for example ZigBee, Z-Wave, Bluetooth, and so on) or protocols that will be devised in the future.

According to an embodiment of the present disclosure controller 122 may be further adapted to sense the status (for example "Open" or "Closed") of an associated non-smart switch, for example of a switch in EEC 101, by activating and/or deactivating corresponding one or more switches in switching circuit 104. Controller 122 may be further adapted to translate the sensed status of switch(es) (for example of a switch in EEC 101) to instructions for initiating, triggering or otherwise causing the activation of, or the provision of electrical power to, non smart electrical devices (for example in EEC 101 and/or in other existing electrical circuit such as EEC 101) in a predetermined manner.

EEC 101 is an exemplary basic electric circuit that may be upgraded or retrofitted, in accordance with the present disclosure, by incorporating a power distribution device such as PDD 100 into the basic home electric circuit, and more specifically into a junction point, as variously explained herein. According to the present disclosure no substitution of devices (lamps, switches, and so on) in EEC 101 with smart devices is required and no wiring changes need be made, and, by using PDD 100, EEC 101 may operate either in the way it operated prior the retrofitting or in enhanced manner, which is more fully described, for example in connection with FIGS. 3a and 3b.

In order to upgrade or retrofit EEC 101 (by enhancing its capabilities, or imparting it smart-home like capabilities), mains power wires and wires of EEC 101 (shown at 102) are interfaced to PDD 100 which is physically adapted to be fitted into, and encapsulated by, the original (existing), usually walled, JP 103, which is part of the basic electric wiring system. This way, no adaptation of JP 103 (to PDD 100) is required, and no existing wires (shown at 102) need be removed or new added in walls, which make the upgrading or retrofitting process simple and relatively inexpensive. If EEC 101 is wired to the general electrical system through one or more terminal blocks in JP 103, these terminal blocks may be removed to make room for PDD 100 which is to be used in their stead, with requested minor wiring changes. Reference numeral 135 denotes electric connections between PDD 100 and the existing wiring system 102, which connection is implemented internally; that is, inside junction point 103.

Switching circuit 104 may be electrically wired (through already existing JP 103) to EEC 101 in such a way that the original functionality of devices in EEC 101, and, therefore, the original functionality (herein referred to as the "basic mode of operation", or, shortly, the "basic mode"), of EEC 101 may be maintained and, on the other hand, it may still be possible to change their functionality to enhance the overall electrical functionality (herein referred to as the "enhanced mode of operation", or, shortly, the "enhanced mode") of EEC 101.

Switching Circuit 104 may include one or more controllable switches that become an integral part of the electrical power system EEC 101 is part of. More specifically, the controllable switches of switching circuit 104 may be instructed by switching circuit 104 (or by controller 122, depending on the application or wanted enhancement degree) to open and/or close electrical circuits in EEC 101 to generally change the configuration, or electrical properties, of EEC 101, and more specifically to switch between the original and enhanced modes.

Usually, PDD 100 may include a controller such as controller 122. However, relatively simple applications may not need a controller such as Controller 122. In applications where a controller such as Controller 122 is absent, Switching Circuit 104 may be adapted to receive (shown at 114), through Communication Module 105, external messages (for example to switch form basic mode to enhanced, mode) and translate these messages into instructions to open or close a given controllable switch or several controllable switches in Switching Circuit 104. Some of the controllable switches of Switching Circuit 104 may be electric-wise positioned in series with some devices in EEC 101 and other controllable switches may be electric-wise positioned in parallel with some devices in EEC 101, to obtain the planned, intended or wanted functionality. In cases where PDD 100 includes a controller such as controller 122, controller 122 may communicate (shown at 124) with Central Controller 106 (through Communication Module 105), as well as other tasks such as activating and deactivating controllable switches in Switching Circuit 104, sensing the status of switches (and possible other devices) in EEC 101, and so forth.

Instructions (herein referred to also as "power regulation instructions") to change the configuration or mode of EEC 101 may originate from Central Controller 106, which may communicate (shown at 115) the power regulation instructions to Communication Module 105. Power regulation instructions may be communicated to Communication Module 105 by using substantially any known communication protocol and/or any communication protocol that will be devised in the future. For example, Central Controller 106 may communicate (shown at 115) power regulation instructions, and other kinds of data as required, to Communication Module 105 by using any power line protocol (for example HomePlug, UPB, X10, and so on), or any combination thereof, or wireless communication protocols (for example Bluetooth, WiMax, WiLan, Wi-Fi, Wireless USB, Z-Wave, ZigBee, and so on), or any combination thereof, or a protocol that combines wireless and cable communications (for example INSTEON), or an Infrared ("IR") compatible protocol such as IrDA. As far as power line protocols are concerned, instructions may be communicated (shown at 123) to Communication module 105 over existing wiring (shown at 102) and received or intercepted (shown at 125) through, or by being wire tapped in, JP 103. In the absence of controller 122, Communication Module 105 may translate in its stead the instructions received (shown at 114) from controller 106 to a format understandable by Switching Circuit 104.

Figure 2A:
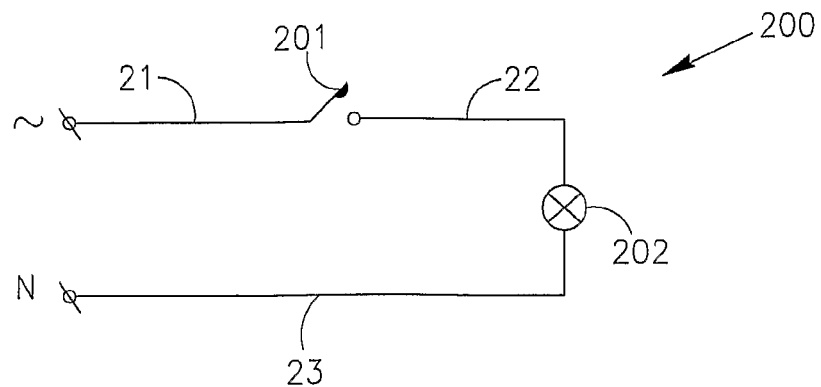
FIG. 2a schematically illustrates an exemplary basic electric circuit diagram.

Referring now to FIG. 2a, an exemplary basic electric circuit diagram (generally shown at 200) is schematically shown and described. An alternate current (AC) power is provided to basic electric circuit 200 that includes a dumb switch (shown at 201) and dumb lamp (shown at 202). Switch 201 is shown in "OPEN" position. Lamp 202 may be switched "ON" (or "OFF") by switching switch 201 to "CLOSE" (or "OPEN") position. Wire 21 feeds the power's phase to switch 201. When in closed position, switch 201 feeds through wire 22 the phase to lamp 202, which is shown receiving the power's neutral. Electric circuits such as electric circuit 200 are very common, and they are often implemented by using a junction point such as junction point 103 of FIG. 1, as is demonstrated in FIG. 2b.

Figure 2B:
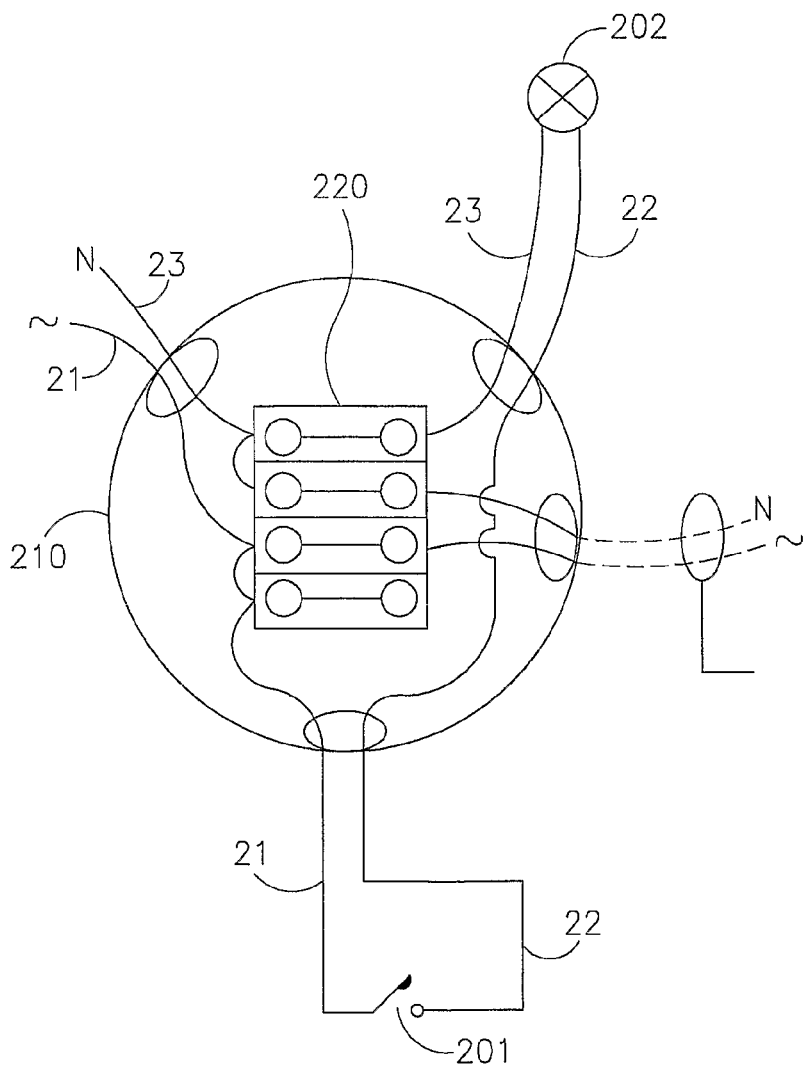

Referring now to FIG. 2b, an exemplary junction point (generally shown at 210) for implementing the exemplary electric circuit diagram of FIG. 2a is shown and described. In respect of FIGS. 2a and 2b, like reference numerals refer to like elements. Wires 21, 22 and 23 of FIG. 2a are shown passing through junction point 210 that includes an exemplary terminal box (shown at 220) that provides connection points to the wires. Junction points such as junction point 210 are very common in industrial and residential applications, and their space may be exploited, in accordance with the present disclosure, to enhance the functionality of, or retrofitting, electric circuits such as electric circuit 200, as is more fully described in connection with FIGS. 3a and 3b, for example.

Figure 3A:
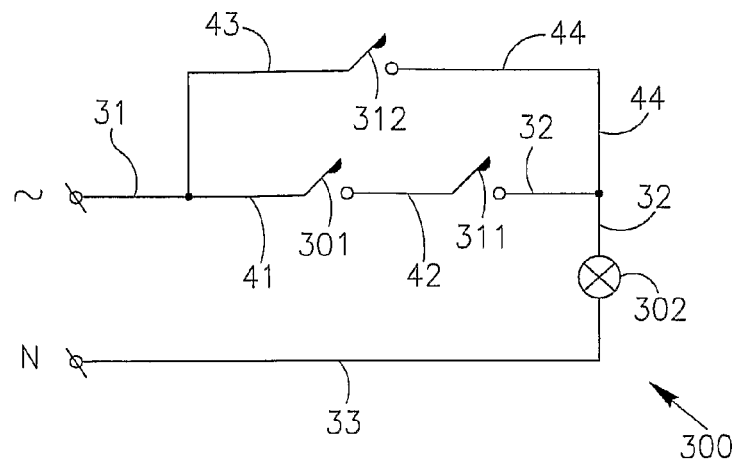
FIG. 3a schematically illustrates an electrical circuit/diagram in accordance with an embodiment of the present disclosure.

Referring now to FIG. 3a, an electrical circuit diagram (generally shown at 300) is shown and described in accordance with an embodiment of the present disclosure. Electrical circuit 300 is a retrofitting circuit of circuit 200 of FIG. 2a. An alternate current (AC) power is provided to retrofitting electric circuit 300 that includes a dumb switch (shown at 301) and dumb lamp (shown at 302). Retrofitting electrical circuit 300 and basic electric circuit 200 of FIG. 2a are similar to the extent that they both include a dumb switch (switch 201 in FIG. 2a and switch 301 in FIG. 3a) and a dumb lamp (lamp 202 in FIG. 2a and lamp 302 in FIG. 3a). However, as opposed to electrical circuit 200, electrical circuit 302 includes also two retrofitting controllable switches, denoted 311 and 312, for enhancing the functionality of the original circuit (dumb switch 301 and lamp 302). Exemplary controllable switches 311 and 312 may be part of a switching circuit such as Switching Circuit 104 of FIG. 1, and activated or deactivated, for example by a controller such as Controller 122 of FIG. 1 or, in the absence of Controller 122, by Communication Module 105.

Exemplary controllable switch 311 is shown electric-wise positioned in series with (dumb) switch 301, and exemplary controllable switch 312 is shown electric-wise positioned parallel to (dumb) switch 301 and controllable switch 311. Therefore, retrofitting controllable switches 311 and 312 enable the selection of, or switching between, basic mode and enhanced mode. That is, if controllable switches 311 and 312 are in "Closed" and "Open" condition, respectively, the basic mode prevails, which means that lamp 302 may be switched "ON" and "OFF" using switch 301. However, if controllable switch 311 is in "Open" condition, the enhanced mode prevails, which means that switch 301 becomes inoperable because switch 311 in open, and the functionality of switch 301 is performed, or overridden, by switch 312. That is, lamp 302 cannot be switched "ON" and "OFF" using switch 301 but, rather, it can be switched "ON" and "OFF" using switch 312. As is explained earlier in connection with FIG. 1, controllable switches (such as controllable switches 311 and 312) may be operated remotely, for example by Central Controller 106. By changing the state of controllable switches 311 and 312 (for example), Central Controller 106 may enable the basic mode or the enhanced mode, and switch between the two modes when desired or required.

According to an embodiment of the present disclosure a controller such as controller 122 of FIG. 1 may sense the status (for example "Open" or "Closed") of switch 301 (in basic mode, enhanced mode or both), by closing and opening switches 311 and 312, respectively. In order to enable the sensing of the status of switch 301, a shunt resistor may be positioned in series with switch 301. In general, a shunt can be used to measure current. In this case a resistor of accurately-known resistance, the shunt, may be placed in series so that when switch 301 conducts current the current passing through switch 301 may be measured, for example by controller 122 (for example). The controller may translate sensed status of switch(es) to instructions for initiating, triggering or causing the activation of, or the provision of electrical power to, non-smart electrical devices in a predetermined manner. For example, if circuit 300 operates according to the enhanced mode, switch 301 may be switched "ON" and "OFF" several times during a relatively short period (for example 3 times during a 5-second period) by a user to signal (with the "signaling switch") to a controller such as controller 122 of FIG. 1 that the user wants to switch "ON" a lamp or lamps connected to different junction points that also encase, or contain, a power distribution device such as the PDD 100 of FIG. 1.

Alternatively or additionally, controller 122 may be functionally coupled to different kinds of sensors and/or detectors (for example, motion detectors, light sensors, and so on) which sensors and detectors may generate and provide signals to controller 122 instead of, or in addition to, one or more signaling switches. For example, controller 122 may be coupled to light sensor(s) and configured, or adapted, to cause corresponding lamp(s) to switch "ON" responsive to an indication from light sensor(s) that the ambient or room's light level is lower than a predefined threshold level. According to another example, a PDD may include a programmable timer to switch a lamp between "ON" and "OFF" states, or to perform other tasks, such as providing electrical power to a given electric socket, at specified, or programmed instants.

A controller receiving from a user such a signal may transmit, directly or indirectly (through a common central controller such as central controller 106), corresponding instructions to the one or more intended or associated power distribution devices. Each PDD receiving an instruction may then operate its switching module to cause the intended lamp(s) to switch "ON", as requested by the user. The latter example demonstrates that a dumb switch can be used to switch, activate or operate, an electrical device (for example a lamp) which is not connected to the dumb switch in the electrical sense. That is, the signaling dumb switch and the electrical device do not belong to the same electric circuit, which means that no electric wires interconnect them because the electrical device was originally planned to be controlled by a different dumb switch that forms with it a different electric circuit, or a part of a different electric circuit.

As is explained earlier, in enhanced mode (when controllable switch 311 is in "OPEN" position), controllable switch 312 functionally overrides dumb switch 301. Therefore, in addition to the normal operation of dumb switch 301 (causing lamp 302 to be switched "ON" and "OFF", but not in an intermediate condition), controllable switch 312 may be controlled (for example by a controller such as controller 122) to operate in such a way that lamp 302 receives only part of its designated full electric power, whereby obtaining a dimmer like functionality or effect. The electric power fed to lamp 302 may be controlled, for example by intermittently opening and closing controllable switch 312 in a corresponding frequency and duty cycle.

Figure 3B:
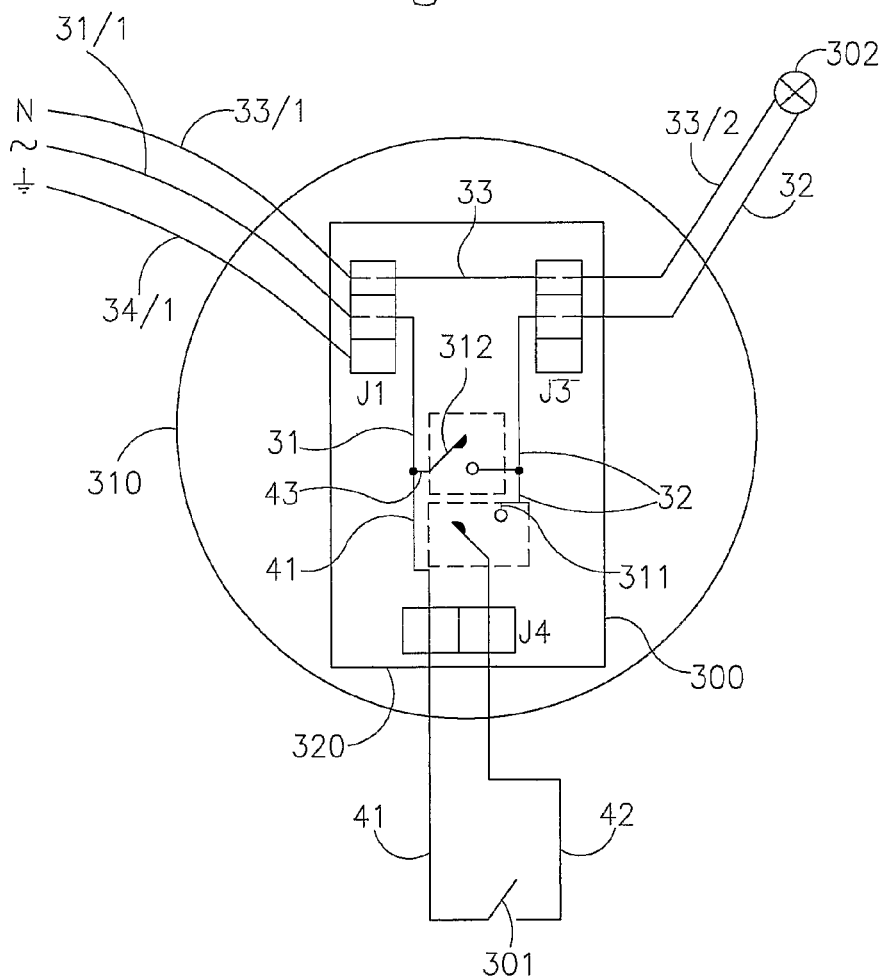

Referring now to FIG. 3b, an exemplary junction point (generally shown at 310) for implementing the exemplary electric circuit diagram 300 of FIG. 3a is shown and described in accordance with the present disclosure. In respect of FIGS. 3a and 3b, like reference numerals refer to like elements. Wires 31, 32, 33, 34, 41 and 42 are existing wires, meaning that these wires are part of the basic (original or existing) electric system, and they pass through, or enter, an existing junction point 310. As is explained earlier, neither wiring, redoing, nor usage of smart-home devices is required to retrofit electric circuits similar to electric circuit 200 of FIG. 2a, or like electric circuits. The space of junction point 310 may be exploited for encasing a retrofitting power distribution device (PDD) (partly shown at 320) that imparts smart-home like capabilities to dumb switch 301 and dumb lamp 302. Junction point 310 may also provide connection points to existing wires 31, 32, 33, 34, 41 and 42.

Exemplary wires 31/1, 33/1 and 34/1 may be considered as the junction point 310 input lines, and exemplary wires 32, 33/2, 41 and 42 may be considered as the junction point 310 output lines. The switching circuit of power distribution device 320 may be adapted to regulate power flow between the junction point 310 input lines 31/1, 33/1 and 34/1 and the junction point 310 output lines 32, 33/2, 41 and 42. Of course, depending on the actual wiring networking and used electrical devices, the junction point's input lines and/or output lines may differ (compared to input and output lines shown in FIG. 3b) in number and in their functionality.

It is noted that, in addition to the exemplary switching circuit, which includes in tins example only two switches (switches 311 and 312), retrofitting PDD 320 may also include a communication module such as Communication Module 105 of FIG. 1, and a controller such as Controller 122 of FIG. 1, though they are not shown in FIG. 3b. It is also noted that PDD 320 is designed (electrically and mechanically) to be fittingly encased by junction point 310.

Figure 4:
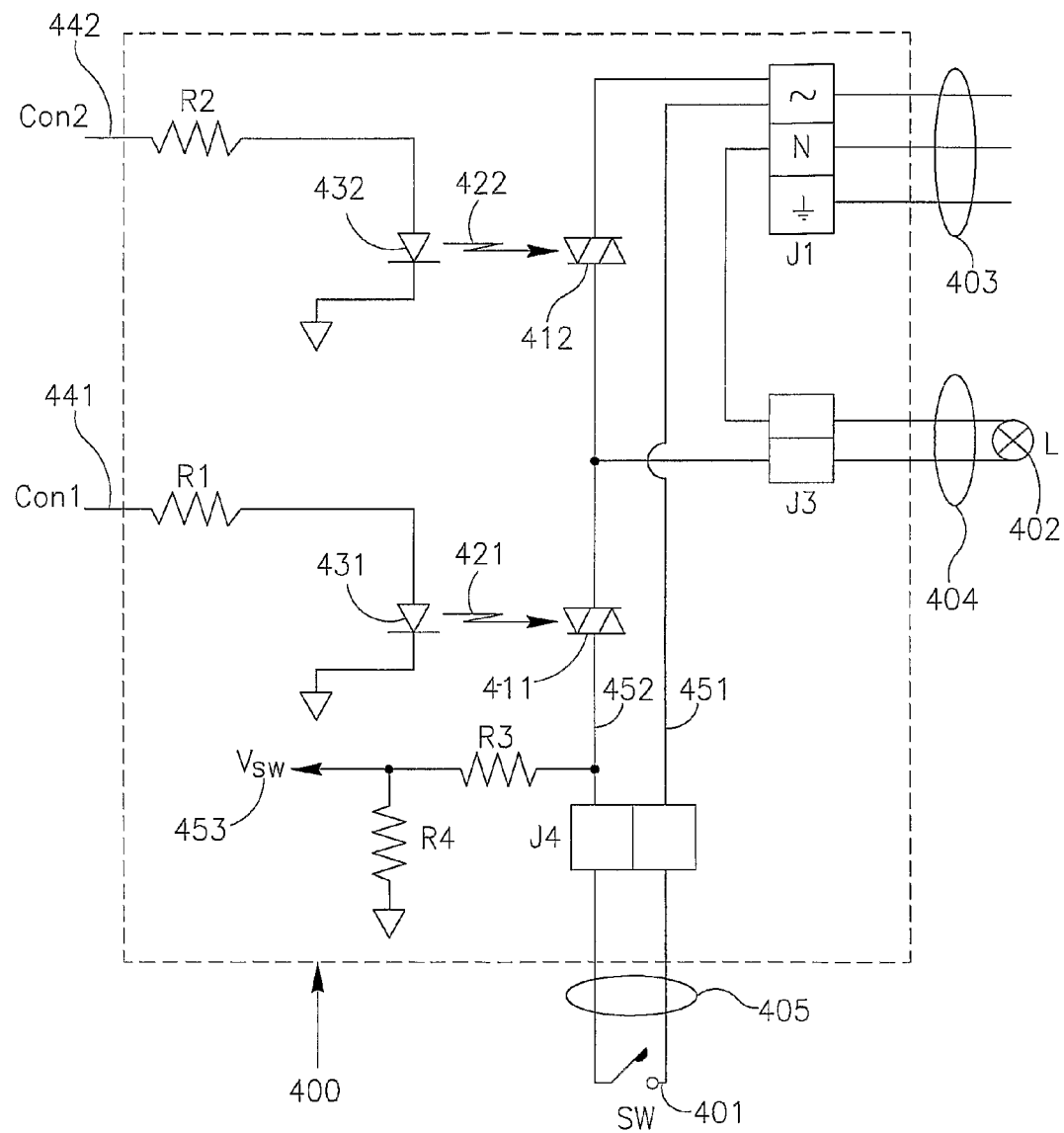
FIG. 4 schematically illustrates an exemplary switching circuit in accordance with an embodiment of the present disclosure.

Referring now to FIG. 4, an exemplary switching circuit (generally shown at 400) is shown and described in accordance with an embodiment of the present disclosure. Exemplary switching circuit 400 may include two controllable switches (shown at 411 and 412), which are implemented, in this example by Triacs. A switch in a switching circuit may be implemented using any electronic switch other than Triac. Triacs 411 and 412 may be optically coupled (shown at 421 and 422, respectively) to Light-Emitting Diodes (LEDs) 431 and 432, respectively. As is known to those having skill in the art, optical coupling 421 and 422 may be implemented using any existing opto-isolators (also known in the art as "optocouplers"). A Triac may be forced to switch from "Close" to "Open" position by applying a corresponding control signal to the associated LED. For example, Triac 411 may be forced to switch from "Closed" to "Open" condition by applying a control signal (CON1, shown at 441) that will cause LED 431 to emit light. Responsive to an emission of light from LED 431, Triac 411 may switch to "Closed" position. Likewise, Triac 412 may be forced to switch from "Closed" to "Open" condition by applying a control signal (CON2, shown at 442) that will cause LED 432 to emit light. Responsive to an emission of light from LED 432, Triac 412 may switch to "Closed" position. The function of controllable switches 411 and 412 may be implemented in a variety of ways. Control signals CON1 and CON2 (shown at 411 and 412, respectively) may originate from a controller such as controller 122 of FIG. 1 or from a central controller such as Central Controller 106 of FIG. 1, and forwarded to the associated power distribution device through a wireless communication channel such as communication channel 115, or through an existing wiring such as existing wiring system 102.

Switching circuit 400 is shown including three terminal boxes (J1, J3 and J4) for interfacing with the existing wires (shown at 403, 404 and 405) that pass through and/or enter the associated junction point (not shown). For example, terminal box J1 interfaces with the "Phase", "Neutral" and "Ground" wires (herein collectively designated as 403) of the power system. Terminal boxes J3 interfaces with the wiring (collectively designated as 404) of lamp 402, and terminal boxes J4 interfaces with the wiring (collectively designated as 405) of switch 401. The electric circuit shown in FIG. 4 functions as discussed in connection with the electronic circuit of FIG. 3a.

As is explained earlier, applying a trigger pulse to the control gate of a Triac at a controllable point in an AC cycle allows to control the percentage of current that flows through the Triac to the load. Therefore, when in enhanced mode (Triac 411 is opened to disconnect switch 401), Triac 412 may be operated (intermittently switched "ON and "OFF") to obtain a dimmer-like effect.

FIG. 4 also demonstrates an exemplary way for sensing the status ("Open" or "Close") of a switch such as switch 401 of exemplary switching circuit 400. Since the "input line" 451 of switch 401 is directly and unconditionally connected to the power supply input (shown as alternating mark in J1), the voltage level sensed at "output line" 452 of switch 401 may indicate the status of switch 401. That is, whenever switch 401 is closed, lines 451 and 452 create one line, which means that lines 451 and 452 are under the same highest possible voltage. In distinction, whenever switch 401 is opened, the voltage on line 452 drops to zero, or near zero, voltage, since, as is explained herein, at least one of controllable switches 411 and 412 is at "Open" state at any given instant.

In order not to interfere with the operation of the exemplary switching circuit 400, and with the operation of the involved PDD as a whole, only a portion (shown as $V_{SW}$ at 453) of the voltage level at line 452 may be utilized for determining the status of switch 401. The value of $V_{SW}$ (shown at 453) may alternate or swing between a minimum level or boundary (a zero, or near zero, voltage), which indicates that switch 401 is "Open", and a maximal level or boundary, which indicates that switch 401 is "Closed". That is, at any given time the value of $V_{SW}$ may be either zero (or near zero), or at the maximal level, depending on the status of switch 401 at the given time. The value of $V_{SW}$ may be internally (in the involved PDD) processed analogically and/or digitally to determine the status of switch 401.

Figure 6:
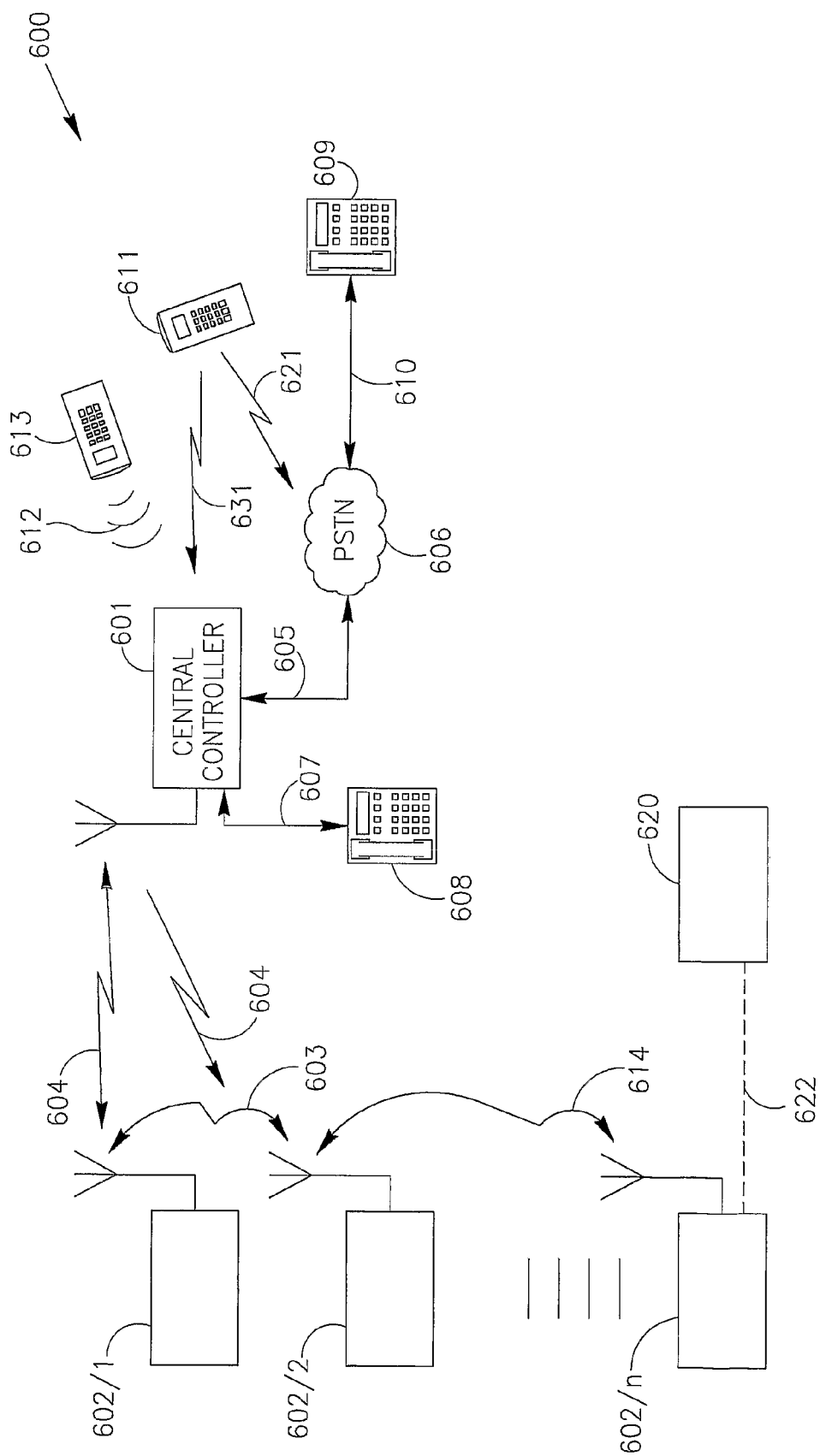
FIG. 6 schematically illustrates a general layout and functionality of a power distribution system for retrofitting a basic electrical system according to an embodiment of the present disclosure.

Once the status of switch 401 has been determined, a message (for example "switch 401 is open") may be communicated (if required or desired) to a central controller such as central controller 601 of FIG. 6 and/or to another one or more PDDs. In addition, as is explained herein, determining the status of a switch such as switch 401 enables a person to generate distinct signals or instructions for one or more PDDs. For example, two temporally adjacent "Open-to-Closed" changes, or "Open-to-Closed" immediately followed by a "Closed-to-Open" change (for example), may instruct the involved one or more PDDs to switch on one or more lamps that may be directly controlled by a PDD, or indirectly (through another one or more PDDs). This way, a person may, for example, utilize a switch in one room to switch one or more lamps in other one or more rooms, according to a predetermined scheme, schedule, program or plan. Similarly, a switch may be utilized for other purposes, for example for activating/deactivating an air-conditioning system, folding an electrical roll-up blind, and so on.

Figure 5:
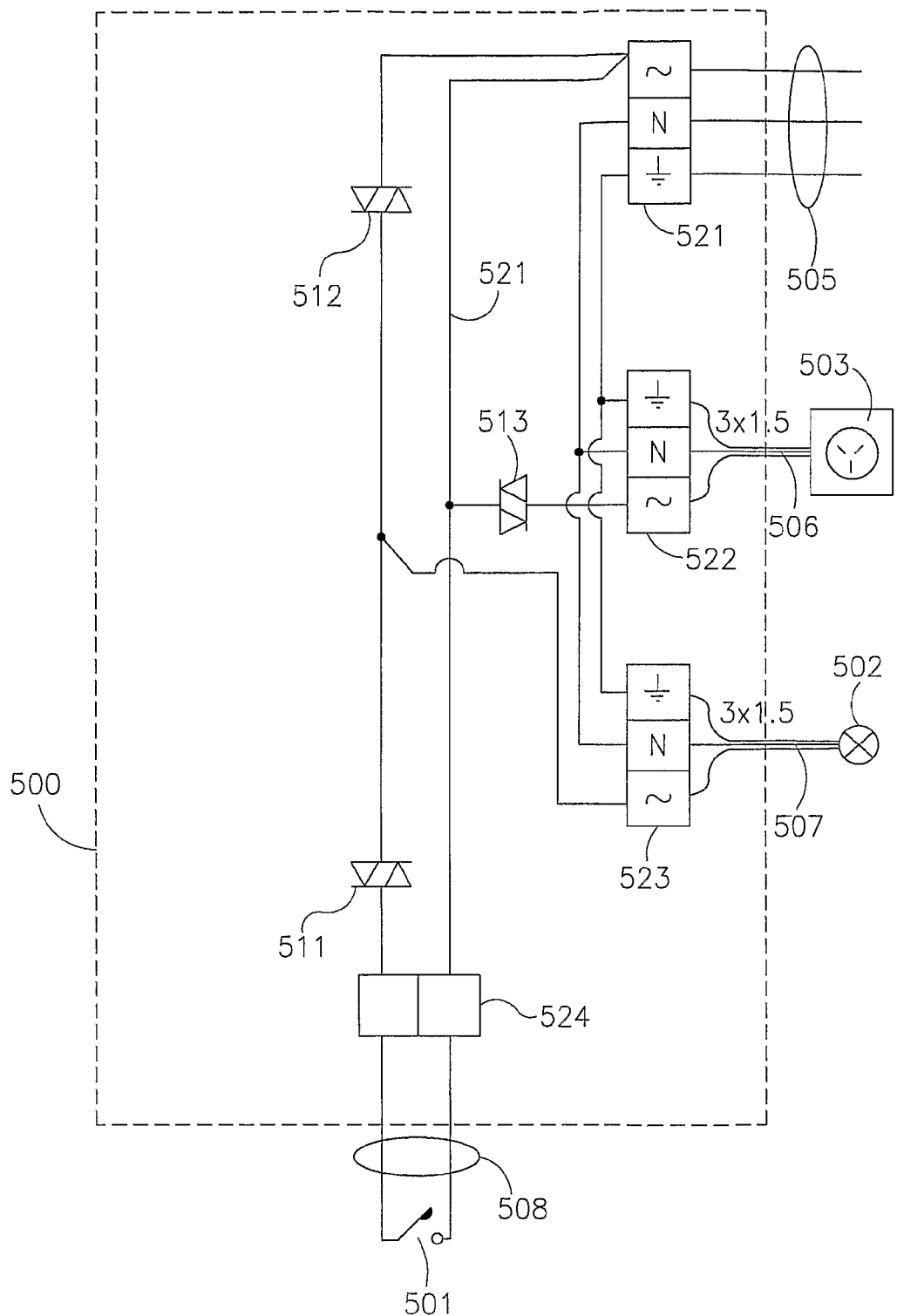
FIG. 5 schematically illustrates an switching circuit in accordance with another embodiment of the present disclosure.

Referring now to FIG. 5, an exemplary switching circuit (generally shown at 500) is shown and described in accordance with another embodiment of the present disclosure. Exemplary switching circuit 500 includes three controllable switches (shown at 511, 512 and 513), which are implemented, in this example, by Triacs. Like Triacs 411 and 412 of FIG. 4, Triacs 511, 512 and 513 may be optically coupled to LEDs (not shown), to facilitate their control in the way described in connection with Triacs 411 and 412 of FIG. 4, or they may be controlled in a different manner, for example by wiring their control gates to control inputs. Assuming that Triacs 511, 512 and 513 are controlled through an opto-coupling mechanism such as the opto-coupling mechanism described in connection with FIG. 4, a Triac may be forced to switch from "Closed" to "Open" position by applying a corresponding control signal to the associated LED, as discussed earlier. The function of controllable switches 511, 512 and 513 may be implemented in a variety of ways.

Controllable switches 511 and 512 may be associated with switch 501 and lamp 502 in the way controllable switches 411 and 412 are associated with switch 401 and lamp 402. As opposed to the electric circuit shown in FIG. 4, the electric circuit shown in FIG. 5 includes an additional controllable switch (shown at 513) that is associated with electric outlet 503. In a home having a basic electrical system a dumb electric outlet such as electric outlet 503 is normally continually connected to the power line, for which reason if an electrical appliance is connected (usually with a plug) to the electric outlet, the appliance itself has to be switched "ON" and "OFF", if so desired. However, by using controllable switch 513, one may locally or remotely disconnect electric outlet 503 from the main power line (shown at 521), by forwarding, for example to Communication Module 105, an instruction that will cause controllable switch 513 to open. At will or according to a stored program, plan or schedule, another instruction may be forwarded to Communication Module 105 (for example), that will cause controllable switch 513 to close and to the power line (shown at 521) to be reconnected to electric outlet 503.

Main power line 505 may be connected to the mains terminal block 521 in Switching Circuit 500. Electric outlet 503 may be connected by cable 506 to terminal block 522 in Switching Circuit 500. Lamp 502 may be connected by cable 507 to terminal block 523 in Switching Circuit 500, and switch 501 may be connected by cable 508 to terminal block 524 in Switching Circuit 500.

It is noted that a switching circuit may include multiple circuits like the circuit of FIG. 4, multiple circuits like the circuit of FIG. 5, a combination of one or more circuits like the circuit of FIG. 4 and one or more circuits like the circuit of FIG. 5, or a combination of one or more circuits like the circuit of FIG. 4 and one or more circuits like the circuit of FIG. 5 and other circuits that may be associated with the operation of electrical devices other than a switch and lamp.

Referring now to FIG. 6, a system (generally shown as 600) for retrofitting a basic electrical system is shown and described according to an embodiment of the present disclosure. Retrofitting system 600 may include a central controller (shown at 601), which may be adapted to communicate with one or more power distribution devices (PDDs), designated 602/1, 602/2, . . . , 602/n, through the respective communication module. According to an embodiment of the present disclosure any one of PDDs 602/1 through 602/n, which may be similar to PDD 100 of FIG. 1, may be encased by a junction point that is located in a different, to enhance the functionality of the electric circuit whose wires go through, or enter, the junction point and thus the functionality of the home's basic electrical system as a whole. According to an embodiment of the present disclosure two or more of PDDs 602/1 through 602/n may be encased by a common junction point. Central controller 601 may be connected (shown at 605) to PSTN 606 and, if desired, also to a home telephone set (shown at 608).

According to an embodiment of the present disclosure a power distribution device, for example PDD 602/1, may communicate control data, power regulation instructions and, if required, other lands of data, to another power distribution device, for example to PDD 102/2 directly (shown at 603), or indirectly (shown at 604), such as, for example through central controller 601, or through other one or more PDDs functioning as router(s). PDDs may be implemented as a mesh network, for example through using ZigBee-enabled devices. Briefly, a mesh network is defined as a network with nodes with connections to the several other network nodes. In a full mesh network, every node has a connection to every other node. In a partial mesh network, every node isn't connected to every other node; instead, only a subset of nodes are joined. Mesh networking is more fully described, for example in "Addressing wireless mesh networking challenges" (By David Gamba, Xilinx Inc., May 3, 2005; web site www.embedded.com/columns/showArticle.jhtml!articleID=162101033), "Scale the hurdles associated with mesh networks" (By David Davies and Chris Davies, Order One Networks, Apr. 26, 2005, web site www.embedded.com/shared/printableArticle.jhtml!articleID=161600355), and "Home networking with Zigbee" (By Mikhail Galeev, Courtesy of Embedded Systems Design, Apr. 20, 2004), the content of which are herein incorporated by reference in their entirety.

For example, PDD 602/1 may communicate control data, power regulation instructions and, if required, other kinds of data, to PDD 602/n by first communicating (shown at 603) them to PDD 602/2, and then (shown at 614) from PDD 602/2, which serves in this example as a relay, to PDD 602/n, possibly with additional data or information that may be related to the relaying PDD (PDD 602/2, in this example). Communicating control data, power regulation instructions and, if relevant, the other kinds of data, may be implemented using substantially any communication technology that may include any wired (such as power line protocols) and/or wireless communication protocol existing today (for example ZigBee, Z-Wave, Bluetooth, optical communication protocols, and so on) or that will be devised in the future. Each PDD's communication module may be adapted to bidirectionally communicate with central controller 601 using any kind of suitable signal, for example optical signals, radio frequency (RF) signals and so on, and/or using any known power line protocol and power line protocol that will be devised in the future, or any communication protocol that may fall into that category.

According to an embodiment of the present disclosure Central Controller 601 may be programmed to transmit predefined instructions to one or more of PDDs 602/1 through 602/n to activate, deactivate, switch "ON", switch "OFF", or to otherwise control the operation of, one or more electric devices and/or one or more electric outlets associated with the one or more of PDDs 602/1 through 602/n. According to an embodiment of the present disclosure a PDD may periodically send "alive" signals to Central Controller 601 for indicating to Central Controller 601 that it is "alive", meaning it is operative and functions well, or as expected or as planned. According to an embodiment of the present disclosure a PDD may send "alive" signals to Central Controller 601 when requested to do so by Central Controller 601 or voluntarily.

Alternatively or additionally, Central Controller 601 may be adapted to receive one or more control messages to operate electric devices and/or electric outlets associated with (controllable through) given PDDs. For example, Controller 601 may receive a remote control message from a user through the user's remote telephone set 609 that is connected (shown at 610) to PSTN 606. In order to facilitate the usage of PSTN 606 as a medium for forwarding to Central Controller 601 control messages (for example forwarding control messages by telephone set 609), Central Controller 601 may be equipped with an Interactive Voice Response (IVR) module, and/or they may have VoIP communication and/or SMS and/or any type of IM (instant messaging) capability, (not shown), and so on.

According to an exemplary scenario, a user may call home (for example to home telephone set 608), for example by using telephone set 609 or a mobile phone (show at 611) and, responsive to the call attempt the IVR module of Central Controller 601 may prompt the caller to select one or more instructions that the user wants Central Controller 601 to communicate to specified one or more junction points. According to an embodiment of the present disclosure the user may use mobile phone 611 to directly forward (shown at 631) to Central Controller 601 power regulation instructions, and Central Controller 601 may include a communication module that is adapted to wirelessly receive such instructions.

According to another exemplary scenario, a user may forward (shown at 612) instructions to Central Controller 601 by using a remote controller (shown at 613). Remote controller 613 may be a universal device (a device that is usually capable of controlling, for example a television (TV) set, stereo system, and so on) that is adapted to transmit instructions in accordance with the present disclosure. Alternatively, remote controller 613 may be a controller dedicated for implementing the avowed goals of the present disclosure.

Remote controller 613 may contain all the main function controls while the controlled device itself (Central Controller 601) may have only a handful of essential primary controls. Remote controller 613 may communicate messages or instructions to Central Controller 601, for example by using infrared (IR) or radio frequency (RF) signals. In order to enable the usage of a remote control such as remote controller 613, Central Controller 601 may be equipped with a matching (IR or RF, respectively) receiver.

According to an embodiment of the present disclosure if a home has an electrical device that is one of its kind in the house, the user may eschew sending to Central Controller 601 an instruction that is specific. Instead, the user may forward to Central Controller 601 a more general and simple instruction. For example, assuming that there is only one boiler (shown at 620 as an example) in the house, the user may forward (shown at 621) to Central Controller 601 a simple instruction such as "Turn ON the boiler", and, being unique, Central Controller 601 may identify and forward to the junction point (shown at 602/n) associated with (shown at 622) boiler 620 instructions to switch "ON" and/or "OFF" controllable switches injunction point 602/n, in the manner described, for example in connection FIG. 5; that is, assuming that the boiler has a plug that is engaged with a controllable electric outlet such as electric outlet 503. Central Controller 601 may identify the junction point by using a plan or schema of the house's electrical system, which may be stored, for example in Central Controller 601.

In cases where the controlled device is not unique (there is at least one more of its kind in the house), the user may have to forward to Central Controller 601 an instruction that specifies (identifies) to Central Controller 601 the involved junction point(s) and device(s). An exemplary instruction sent by a user to Central Controller 601 may be "Switch ON lamp No. 5 connected to Junction Point No. 2". The retrofitting system shown in FIG. 6 is scalable because junction points may be easily added or removed, substantially without interfering with the other system's components. Regarding the power distribution device (PDD) and central controller disclosed herein, other embodiments may include more modules, less modules, other modules and/or functionally equivalent modules.

Communication modules such as communication module 105 of FIG. 1, and central centers such as Central Controller 601 may be equipped with an IR transceiver for enabling ER communication there between, and between them and home (for example) IR-enabled devices and systems such as VCR, DVD, air-condition, and so on.

Central controller 601 may be further adapted to receive instructions from a power distribution device (for example from PDD 602/1) based on the status of one or more switches associated with the involved power distribution device (in this example PDD 602/1), and communicating the instructions to other one or more power distribution devices (for example to PDDs 602/2 and 602/n). Therefore, according to the present disclosure, power regulation instructions may be initiated by a central controller, such as central controller 601, and by a switch, such as switch 401, that is electric-wise connected to a PDD.

While certain features of the disclosure have been illustrated and described herein, many modifications, substitutions, changes, and equivalents will now occur to those skilled in the art. It is, therefore, to be understood that the appended claims are intended to cover all such modifications and changes as fall within the true spirit of the disclosure.

What is claimed is:

1. A power distribution device for an existing home electrical system having a main electrical panel receiving input power lines from an external power source and a junction point connected to said main electrical panel, wherein said power distribution device comprises:
   a retrofit power distribution device connectable within a housing of said junction point and comprising:
   a switching circuit regulating power flow between input power lines of said junction point and output lines of said junction point to both a physical switch and a power consumer; and
   a communication module functionally coupled to said switching circuit; and
   a local controller communicating with and receiving power regulation instructions from a local controller of any other power distribution device in said home via said communication module.

2. The device according to claim 1, wherein the switching circuit comprises one or more controllable switches operable according to the received power regulation instructions.

3. The device according to claim 1, wherein switching elements of the switching circuit are Triac devices.

4. The device according to claim 1, wherein the communication module is adapted to wirelessly communicate.

5. The device according to claim 1, wherein the communication module is adapted to communicate using optical signals or radio frequency signals.

6. The device according to claim 1, wherein the communication module is adapted to communicate using Bluetooth, Wi Max, Wi Lan, Wi-Fi protocols, or any combination thereof.

7. The device according to claim 1, wherein the communication module is adapted to communicate using a power line protocol.

8. The device according to claim 1, wherein the communication module is adapted to communicate using X10, UPB or HomePlug protocol.

9. The device according to claim 1, wherein the local controller is further adapted to receive instructions from a power distribution device based on the status of a switch associated with the power distribution device, and communicating the instructions to other one or more power distribution devices.

10. The device according to claim 1, wherein said local controller comprises a unit to sense a status of associated non-smart switches in said home electrical system.

11. The device according to claim 10, wherein the power distribution device is further adapted to transmit a message corresponding to the sensed status of one or more switches.

12. The device according to claim 10, wherein sensing the status of a switch is utilized to generate power regulation instructions for said power distribution device or for other one or more like power distribution devices.

13. The device according to claim 10, wherein said local controller comprises a unit to translate sensed status of said non-associated non-smart switches to instructions for initiating, triggering or otherwise causing activation of, or the provision of electrical power to, non smart electrical devices in said home electrical system in a predetermined manner.

* * * * *